(12) United States Patent
Kerselaers (10) Patent No.: US 9,054,773 B2
(45) Date of Patent: Jun. 9, 2015

(54) APPARATUS COMPRISING A BROADCAST RECEIVER CIRCUIT AND PROVIDED WITH AN ANTENNA

(75) Inventor: Anthony Kerselaers, Herselt (BE)

(73) Assignee: NXP B.V., Eindhoven (NL)

( * ) Notice: Subject to any disclaimer, the term of this patent is extended or adjusted under 35 U.S.C. 154(b) by 337 days.

(21) Appl. No.: 12/933,695

(22) PCT Filed: Mar. 19, 2009

(86) PCT No.: PCT/IB2009/051165
§ 371 (c)(1),
(2), (4) Date: Sep. 21, 2010

(87) PCT Pub. No.: WO2009/116007
PCT Pub. Date: Sep. 24, 2009

(65) Prior Publication Data
US 2011/0028114 A1 Feb. 3, 2011

(30) Foreign Application Priority Data
Mar. 21, 2008 (EP) ..................................... 08102862

(51) Int. Cl.
*H04B 1/10* (2006.01)
*H04B 1/18* (2006.01)

(52) U.S. Cl.
CPC ........................................ *H04B 1/18* (2013.01)

(58) Field of Classification Search
USPC .......... 455/296, 501, 63.1, 67.13, 570, 114.2, 455/135, 222, 226.3, 283, 300, 569.1, 271, 455/82; 330/310; 333/32, 133, 175
See application file for complete search history.

(56) References Cited

U.S. PATENT DOCUMENTS

| | | | |
|---|---|---|---|
| 5,352,992 A * | 10/1994 | Asazawa | 330/310 |
| 5,564,096 A * | 10/1996 | Hama et al. | 455/300 |
| 6,262,637 B1 * | 7/2001 | Bradley et al. | 333/133 |
| 6,281,946 B1 | 8/2001 | Hisada et al. | |
| 6,697,605 B1 * | 2/2004 | Atokawa et al. | 455/82 |
| 6,973,296 B2 * | 12/2005 | Webster et al. | 455/296 |
| 7,468,638 B1 * | 12/2008 | Tsai et al. | 331/126 |

(Continued)

FOREIGN PATENT DOCUMENTS

| | | |
|---|---|---|
| CN | 1368766 A | 9/2002 |
| CN | 1625844 A | 6/2005 |
| WO | 2005/006579 A1 | 1/2005 |

OTHER PUBLICATIONS

Wikipedia: "http://web.archive.org/web/20071130130020/http://en.wikipedia.org/wiki/Carrier-to-noise_ratio", Nov. 30, 2007.*

(Continued)

*Primary Examiner* — Junpeng Chen (57) ABSTRACT

The invention relates to an apparatus 1 comprising a broadcast receiver circuit, an embedded antenna for receiving broadcast signals and a tuning circuit coupled between the antenna and the receiver circuit, which tuning circuit comprises a filter circuit coupled to ground, wherein the tuning circuit is designed to have a first resonance at a first frequency below a broadcast band of interest, and a second resonance at a second frequency above the broadcast band and wherein the tuning circuit comprises an amplifier with an output to the receiver circuit and with an input to the filter circuit, and wherein the tuning circuit is provided with a carrier to noise ratio (CNR) which is substantially flat across the broadcast band.

19 Claims, 4 Drawing Sheets

(56) References Cited

U.S. PATENT DOCUMENTS

| | | |
|---|---|---|
| 7,933,574 B2 * | 4/2011 | Rofougaran et al. ...... 455/248.1 |
| 2002/0105474 A1 | 8/2002 | Kitamura et al. |
| 2004/0217827 A1 * | 11/2004 | Gonzalez Moreno et al. ............... 333/175 |
| 2005/0107042 A1 | 5/2005 | De Graauw |
| 2005/0120067 A1 * | 6/2005 | Koyanagi ...................... 708/300 |
| 2005/0227662 A1 * | 10/2005 | Adachi et al. ................. 455/283 |
| 2006/0038632 A1 * | 2/2006 | Niu et al. ........................ 333/32 |
| 2007/0296525 A1 * | 12/2007 | Kokubo ........................ 333/175 |
| 2008/0031126 A1 | 2/2008 | Feher |
| 2008/0280654 A1 * | 11/2008 | Solomon .................... 455/569.1 |
| 2008/0287084 A1 * | 11/2008 | Krebs et al. .................. 455/271 |

OTHER PUBLICATIONS

"Digital Transmission: Carrier-to-Noise Ratio, Signal-to-Noise Ratio, and modulation Error Ratio", Cisco Systems, Nov. 18, 2006, pp. 1-7.*

International Search Report for Application PCT/IB2009/051165 (Mar. 19, 2009).

* cited by examiner

APPARATUS COMPRISING A BROADCAST RECEIVER CIRCUIT AND PROVIDED WITH AN ANTENNA

FIELD OF THE INVENTION

The invention relates to an apparatus comprising a broadcast receiver circuit and provided with an antenna for receiving broadcast signals and comprising a tuning circuit coupled between the antenna and the receiver circuit.

BACKGROUND OF THE INVENTION

In audio devices, radio reception in the AM frequency range is normally achieved by providing an internal ferrite antenna. Such ferrite antennas are configured for a predetermined frequency band in the radio spectrum. The ferrite antenna provides the functions of both an antenna receiving the magnetic part of the electromagnetic wave, and a resonant circuit with an additional capacitance. The first stage of a subsequent antenna amplifier may then have a wide band configuration, while selectivity is obtained in the second amplifier stage.

Such ferrite antennas may be disadvantageous in that internally generated electromagnetic fields (e.g. from a central processing unit (CPU), a microcomputer (µC) or the like) are picked up as noise. Additionally, the physical dimensions of the internal ferrite antenna are a key factor for sensitivity of AM reception. Increased miniaturization of audio devices with radio receivers requires smaller ferrites, which leads to undesirable decreases in sensitivity of radio reception.

By putting the AM antenna outside the housing, sensitivity can be increased and additional area can be made available on a printed circuit board (PCB) by removing the ferrite. This freed area can be used for other circuit elements.

One placing option for external radio antennas may be a headset of the audio device, including a wire to a handset. This is suggested for example in the US 2005/0285799 A1 which discloses a headset loop antenna implemented by loop sections which include inductors and wherein conductors to the earplugs contain ferrite beads. Each conductor in the loop section forms a matching element in that it matches to the desired reception frequency of the loop antenna. The loop antenna segments are coupled to one another and to a conductive antenna lead section at a Y-type coupler. Alternatively, the two antenna loop segments may be joined directly at a plug of the headset.

However, to emulate the presence of a ferrite antenna and/or to tune the loop antenna to the desired frequency range, proper selection of the inductors within the antenna loop configuration is crucial for matching the antenna to the receiver circuit and frequency range.

Another option for an external antenna placement resides in the use of the headset wire. For such headset wire, a reception curve is deducible. However, this curve has been measured as a wire attached to the roof in free space. In practice, the input impedance continuously changes, as the wire is in contact with a human body. This decreases the antenna performance. The decrease in antenna performance is due to reflection. Since both antenna and the radio are designed at 75 Ohm input impedance, coupling with the body generates reflection, leading to a radiating antenna and decreasing power transmitted to the radio. The decreased transmission of power is problematic, as many radio channels operate at lower field strength than is supposed on the basis of the standardisation for radio channels.

Thus, in short, it is a problem of the use of the headset wire as antenna that the antenna is sensitive to changes with the environment and thus prone to deviations/shifts in the frequency band.

SUMMARY OF THE INVENTION

It is therefore an object of the present invention to provide an apparatus of the type mentioned in the opening paragraph, wherein the reception of signals is less sensitive to changes with the environment and thus less prone to deviations/shifts in the frequency band.

In a first aspect of the invention, the apparatus comprises a broadcast receiver circuit, an embedded antenna for receiving broadcast signals and a tuning circuit coupled between the antenna and the receiver circuit, which tuning circuit comprises a filter circuit coupled to ground, wherein the tuning circuit is designed to have a first resonance at a first frequency below a broadcast band of interest, and a second resonance at a second frequency above the broadcast band and comprises an amplifier with an output to the receiver circuit and with an input to the filter circuit, and is provided with a carrier to noise ratio (CNR) which is substantially flat across the broadcast band It turns out that the use of an embedded antenna in combination with a specific tuning circuit results in reception of signals in the broadcast band of interest that meets performance requirements in an excellent manner. It was herein understood by the inventor of present invention that a substantially flat carrier to noise ratio is the critical parameter to enable good performance, instead of power matching as often assumed. This implies that a voltage injected into the tuning circuit from the antenna is transformed to a relatively flat amplitude response. With such relatively flat amplitude response a signal can be distinguished from noise even though the signal strength is relatively limited. Suitably a carrier to noise ratio is at least 20 dB behind the amplifier, in case a field strength of 1 mV/m of received signal is applied. Preferably, the carrier to noise ratio is at least 30 dB in such a case.

It is to be observed for clarity that the term 'CNR' has to be distinguished from the term 'signal to noise ratio'. The CNR defines the ratio of the level of a signal in the broadcast band at a certain frequency and the noise at the same frequency, prior to demodulation. The signal to noise ratio relates to the demodulated signal, i.e. after demodulation in the receiver circuit. While the CNR relates to noise at the same frequency (for instance 100 MHz), the signal to noise ratio relates to a signal at a specified frequency (for instance 10 KHz) with the noise in a certain frequency domain (for instance 0 to 20 KHz).

Preferably, the filter circuit and the amplifier have a comparable noise level. This turns out to provide optimum signal transmission. It turns out that a filter circuit with an extremely low noise level may lead to worse overall signal transmission due to mismatch between the filter and the amplifier. Evidently, if the noise level in the filter is too high, the carrier to noise ratio of the filter degrades and the amplifier is not able to adequately amplify signals.

More specifically, the filter circuit comprises at least one inductor with a quality factor in the range of 30 to 100. A quality factor in this range results in sufficiently low noise level.

Furthermore, the embedded antenna is small compared to wavelengths corresponding to the broadcast band. Though an embedded antenna is present at a short distance from other electronic components and thus sensitive to distortion, the use of an antenna with a small size compared to the wavelength turns out to be viable. Suitably, the ratio between wavelength and antenna size is more than 10 and preferably more than 50. Very good results have been obtained with a capacitive strip antenna, though inductance antennas may be used alternatively.

Moreover, the amplifer is preferably designed to have a optimum noise level under conditions that the driving impedance is low-ohmic. Conventionally, an input of the receiver circuit faces a driving impedance of approximately 200 Ohms (when looking from the receiver circuit towards the antenna). This is particularly due to the presence of a non-embedded antenna with a substantial length. In the present situation, the impedance of the filter circuit and embedded antenna sums up to a level of less than 50 Ohms, and preferably even in the range of 5-30 Ohms, more preferably 10-20 Ohms. As a consequence, the amplifier design is to be modified accordingly.

In a preferred implementation, as will be explained with reference to the Figures, use is made of an amplifier with an input electrode having a low connection resistance to the base. Specifically, such low connection resistance is achieved in that the input electrode forms part of a bipolar transistor with a base connection with an extended surface area. Suitably the surface area is at least twice of the conventional value for such input electrode.

Suitably, the amplifier is designed to have a constant amplitude response. Such constant amplitude response implies a small ripple, preferably of less than 3 dB. A larger ripple and variation in the response would result is a frequency dependence of the gain of the amplifier. This leads to performance degradation in the search of radio channels. In order to achieve this constant amplitude response, a good matching of the input impedance and the impedance of the filter circuit is desired. This input impedance is preferably in the range of 20Ω to 500Ω in case of an inductive antenna, and in the range of 300Ω to 2 kΩ for a capacitive antenna.

Most suitably, The amplifier is preferably provided with an internal feedback to the input electrode. This is a proper manner of enabling a constant amplitude response, and particularly will provide an appropriate value of the input impedance, suitable for a capacitive antenna.

The amplifier is preferably comprises a cascode of a first and a second transistor. The amplification level is suitably in the order of 10-30 dB, preferably around 20 dB. In a further implementation, the filter has a classical double tuned filter topology, and the antenna is a capacitive strip antenna. In case of mobile phone as apparatus, it is located at a side remote from other antennas.

In a further embodiment, a transmit circuit is present. This transmit circuit is coupled to the filter circuit for wireless transmission of audio signals through the antenna, wherein the tuning circuit is designed to operate as a filter for suppressing of harmonics in a transmitted signal. Though one conventionally merely receives broadcast signals, recent standardisation also allows transmission within the frequency bands used for broadcast. This particularly relates to audio to be transmitted at low power levels as frequency modulated (FM) signals in the FM frequency range. Object hereof is the transmission of music and other audio from a portable apparatus to an integrated audio system coupled to larger speakers, including car radio and home audio systems.

It has been found most suitably that the coupling from the transmit circuit to the filter circuit is enabled with a capacitor through which RF signal can be transmitted but DC signals are blocked. A capacitor with a capacitance of 0.5 nF or more, for instance 1 nF turns out suitable therefore. In this embodiment, a receive/transmit switch is present between the capacitor and the amplifier and the transmit circuit. A receive/transmit switch is needed to prevent that signals amplified in the transmit circuit directly enter the receive circuit, which is designed for low level signals. This implementation is excellently in line with the desire and need for integration; the receive/transmit switch is designed to be part of an integrated circuit comprising broadcast receiver, the amplifier and the transmit circuit. The capacitor will be a discrete component, or alternatively be integrated within the package. In order to meet requirements of voltage stability, the receive/transmit switch may be implemented as a series connection of a first and a second transistor.

Suitably, the output impedance of the transmit circuit corresponds to the input impedance of the amplifier. This results in the important characteristic that the current response on the antenna is substantially flat over the broadcast band. This characteristic is more important than the provision of a flat voltage response over the broadcast band. The output impedance is for instance in the range of 20Ω to 2 kΩ. Preferably, the output impedance is relatively low, as a transmit circuit with a larger output impedance draws more power from a battery and less therewith to a degradation of efficiency. A range of 100-500Ω, particularly 200-400Ω turns out optimal, and can be achieved when using a capacitive antenna.

In a further modification, an output of the switch towards the filter circuit is polarized to a higher voltage with a resistor. This modification provides a solution for the compatibility of a relatively low supply voltage and the presence of ESD protection element. Generally, any input/output terminal of an integrated circuit is provided with an ESD protection, which are diodes or transistors in a specific configuration. As a result of the ESD protection an input/output terminal has commonly a voltage swing between the supply voltage and ground. However, a radio signal, i.e. in the FM broadcast band, is modulated around ground. It thus has both negative and positive portions. These negative portions would be lost due to the ESD protection. Therefore, the proposed solution is a transformation of the signal level, such that the radio signal is modulated around a center value above ground. In order to use the maximum voltage range available, the FM modulated signal is preferably fittted between ground level and the supply voltage.

Suitably, the receiver circuit is provided with an output to an external antenna and comprises a switch for choosing between the external antenna and the embedded antenna. Such external antenna may be integrated in the wire to the headset. Though communication between a mobile phone and a headset may be established wirelessly, for instance by wireless communication with the Bluetooth protocol, it is desired to offer a user the choice to use a wired headset. An external antenna is suitably coupled to the receiver circuit over a balun.

BRIEF DESCRIPTION OF THE DRAWINGS

These and other aspects of the invention will be apparent from and elucidated with reference to the embodiments described hereinafter. In the following drawings.

DESCRIPTION OF THE PREFERRED EMBODIMENTS

Embodiments of the present invention will now be described. The system according to the present invention comprises an embedded antenna, an tuning circuit and a receiver circuit. The system may be used, for example, to receive broadcast stations like FM radio, DVB-H or others and to transmit an mp3 audio signal originating in the handheld product to an available broadcast FM radio, such as a car radio.

Figure 1:
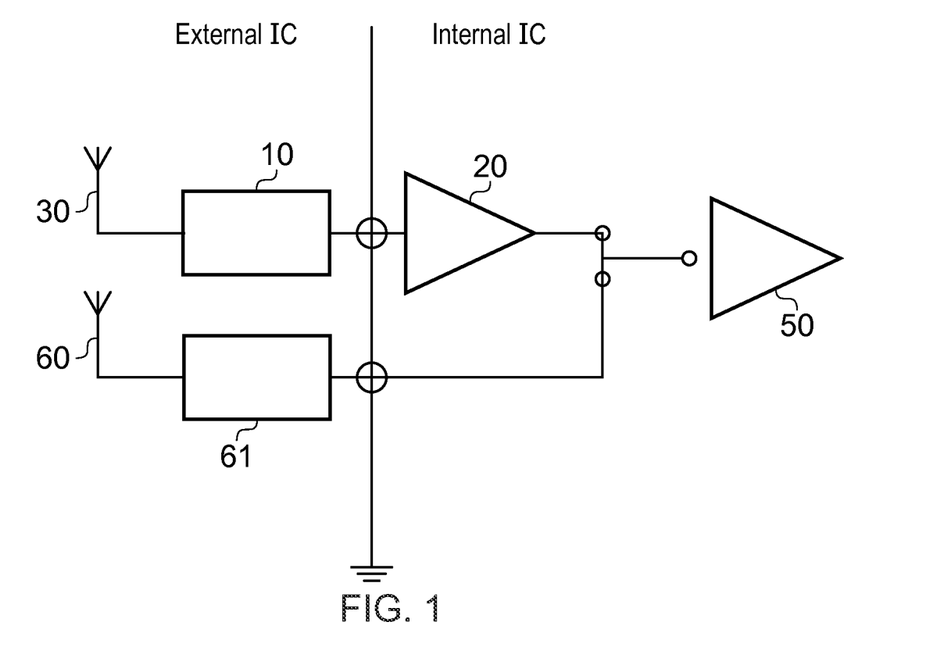
FIG. 1 shows a block schematic of the system of the invention in a first embodiment.

FIG. 1 shows an block schematic of the system of the invention in a first embodiment. The system of this embodiment includes receiver functionality but does not include transmitter functionality. It comprises an embedded antenna 30, a filter circuit 10, an amplifier 20 and a broadcast receiver circuit 50. The filter circuit 10 and the amplifier 20 together constitute the tuning circuit 100 for the embedded antenna 30. The combination of the embedded antenna 30 and the tuning circuit 100 demonstrates satisfactory reception performance for the broadcast band of interest. In the present example, this broadcast band of interest is an audio broadcast band, in particularly the FM-radio band in the range of 87.5 to 108 MHz or 76 to 108 MHZ.

The embedded antenna 30 and its tuning circuit 100 is aimed at replacement of an external antenna. A conventional antenna solution for the same broadcast band uses a wire connected to a user's headset as external antenna. FIG. 1 shows this external antenna 60 too, and a balun 61 for adequate signal transformation. This has several advantages; first a user of the apparatus may choose which antenna it prefers. Secondly, performance of the antenna is very sensitive to environmental conditions and distortion of nearby signals. It may turn out that the embedded antenna has under certain use conditions a distinctly better performance than the external antenna, or vice versa, and this could even be different for a certain subrange in the broadcast band, for a certain type of signals to be received, or for a specific broadcast band to be chosen, in case several broadcast bands are available (eg. DVB-H, etc in addition to FM). The availability of both an external and an embedded antenna allows that the receiver circuit 50 can optimize reception performance by either choosing one antenna or by enabling better error correction on the basis of comparison of signals received through the embedded antenna 30 and the external antenna 60.

As further indicated in FIG. 1, it is most suitable that the amplifier 20 is integrated with the receiver circuit 50 into a single component (i.e. integrated circuit). The other elements are then added as discrete components. However, it is not excluded that capacitors and even small inductors in the filter circuit are integrated into such integrated circuit, or alternatively, into a package for the integrated circuit.

Figure 2:
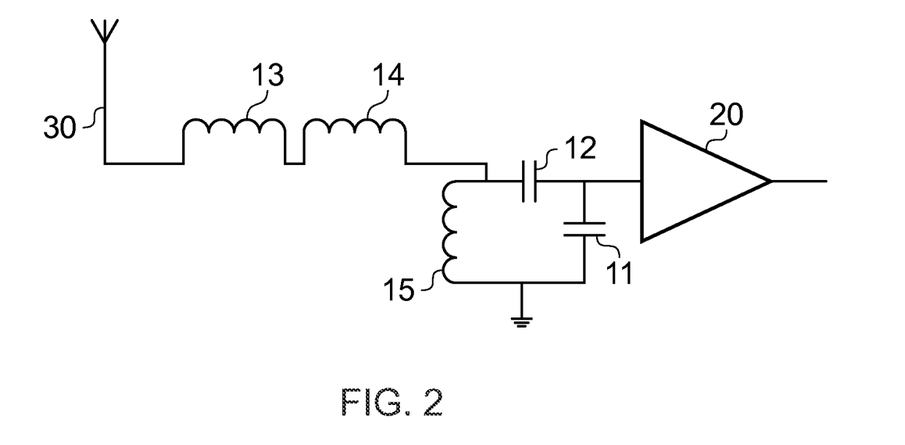
FIG. 2 shows an electric schematic of the embedded antenna and the tuning circuit according to this first embodiment.

FIG. 2 shows an electric schematic of the embedded antenna 30 and the tuning circuit 100 comprising filter circuit 10 and amplifier 20 according to the first embodiment of FIG. 1. The filter circuit 10 has in this embodiment a classical double filter topology with a first and second inductors 13,14 placed in the signal line 19 from the antenna 30 to the amplifier 20. This embodiment is optimized for a capacitive embedded antenna 30. In case of an inductive embedded antenna 30, at least one of the first and second inductors 13,14 is replaced by a capacitor. The filter circuit 10 additionally comprises a third inductor 15 and a capacitor 11 connected in parallel between the signal line 19 and ground, and a further capacitor 12 defined in that signal line between the two parallel branches.

Critical to the invention is particularly the functionality obtained with this classical double filter topology. It is not excluded that the same electrical functionality may also be generated with another specific circuit. This functionality comprises the presence of a first resonance at a first frequency below the broadcast band, and the presence of a second resonance at a second frequency above the broadcast band. As will be explained in more detail with respect to the FIG. 5 and beyond, the first frequency is for example 65 MHz and the second frequency is for example 115 MHz. With the exact combination of the values of the coils and the capacitors it is possible to maximize performance into the band of interest, for example in the range of 76 to 108 MHz. This range corresponds to both the Japanese and the US/European versions of the FM broadcast band. In the specific modification shown in this embodiment, the series inductance defined in the signal line 19 is split into a first and a second inductor 13,14. One would have the risk with a single coil of relatively high inductance that the coil might get into resonance within the broadcast band, leading to malperformance.

The operation of the filter is best explained with the concept of the geometric mean of the band. This geometric mean is defined by the required start and stop frequency of the broadcast band. It turns out that the series circuit formed by the inductance 13/14 in the signal line 19 and including the contribution of the capacitive embedded antenna 30, is inductive for frequencies above the geometric mean of the broadcast band. The series circuit is however capacitive below the geometric mean of the broadcast band. In addition to the series circuit, a parallel circuit is present defined by the capacitance of the embedded antenna 30, the capacitance of the second capacitor 12, as well as the capacitance and inductance coupled to ground by the parallel connection of the first capacitor 11 and the third inductor 15.

In this embodiment, the first resonance at a first frequency below the broadcast band is generated by the parallel circuit with in parallel the equivalent capacitance value of the series circuit. Adding capacitance in parallel reduces the frequency. The second resonance at a second frequency above the broadcast band is generated by the parallel circuit with in parallel the equivalent indutance value of the series circuit. The parallel circuit is inductive at this frequency. This parallel connection reduces the overall inductance, with the result that the second frequency of the second resonance lies above the broadcast band.

While first and second resonances occur below and above the band, the circuit behaves as a series resonant circuit inside the broadcast band of interest. With a certain set of component values it is possible to maximize the performance in the band. The amplitude response over the band may have some ripple but the RF carrier to noise ratio can be optimized. However there should also be sufficient absolute gain over the band. It is observed that the parasitic capacitances of the inductors are not indicated, but are important in the realisation of the circuit. The values of the parasitic capacitances are dependent of the type of the coils and have the effect of enlarging the inductance value for higher frequencies.

The combination of the embedded antenna 30 and the filter circuit 10 is effective, in that as shown above the embedded antenna 30 operates as part of the filter. This is possible because the embedded antenna is mainly reactive. An external antenna is inevitably longer, usually in the order of the wavelength. The present embedded antenna is small in comparison to the wavelength. Small is herein suitably less than a tenth (0.1), preferably less than a twentieth (0.05) of the wavelength or a fourtieth (0.025). As a consequence, the present embedded antenna 30 does not have a substantial radiation resistance. This leads to a high reactive overall impedance, such that transformation of the radiation resistance is not practical feasible.

Particularly preferred is the presence of the second capacitor 12 in the signal line 19. The presence of this capacitor enables a modification of the input impedance of the amplifier to a value that is optimized for the signal to noise ratio.

Figure 3:
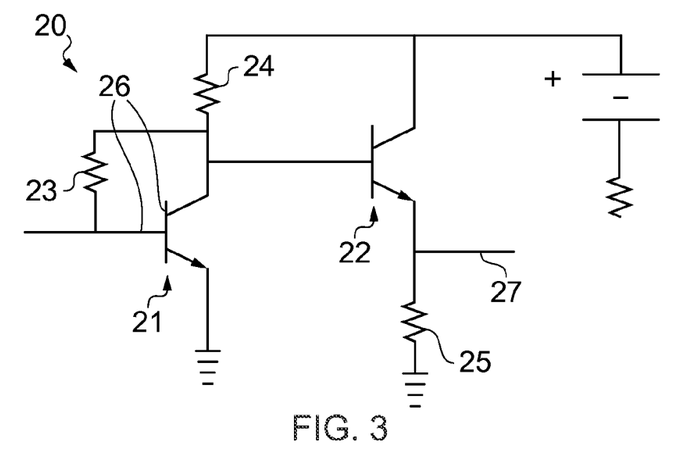
FIG. 3 shows an electric schematic of the amplifier in the tuning circuit.

FIG. 3 shows an implementation example of the amplifier 20 of the tuning circuit 100 of the present invention. The amplifier 20 has a topology with a first transistor 21 and a second transistor 22. The transistors 21,22 are suitably bipolar transistors but CMOS transistors may be used alternatively. The first transistor 21 has an input electrode 26 which receives a signal from the filter circuit 10. In order to have appropriate matching with the filter circuit 10, the amplifier should have a low noise performance. In case of integration of the amplifier, this is achieved in that the input electrode 26 is low ohmic. Particularly, the input electrode 26 is provided to with a larger connection area to an underlying region in the semiconductor substrate, such as the base in case of a bipolar transistor. The term 'larger' herein refers to a comparison with an ordinary transistor. It is particularly the input electrode 26 that is given a larger surface area. The surface area of the other electrodes are less relevant and therefore kept small in order to meet price requirements. In case of integration of the amplifier, suitably, a feedback within the amplifier from the second transistor 22 to the input electrode 26, so as to enable a constant amplitude response over the broadcast band. In this example, resistors 23, 24, 25 are present to regulate feedbacks and currents appropriately.

Figure 4:
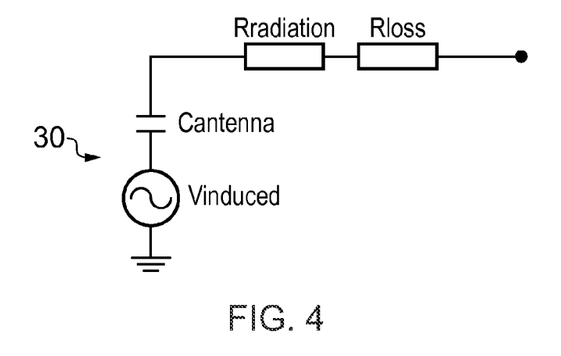
FIG. 4 shows a schematic of an capacitive antenna.

FIG. 4 shows an electric schematic of the embedded capacitive antenna 30. In this example, the antenna is a conducting strip of any shape and can be made of for example of adhesive conductive tape. The antenna 30 comprises a feeding point can be on any place on the conducting strip. The feeding point position gives only a slight variation in performance. Each of the dimensions—length, height and thickness—is below 5% of the wavelength. The thickness (T) can be below 0.1% of the wavelength. Such a construction can be attached on the plastic housing of a final product almost without consuming any volume. Openings in the conductive strip can be used to pass temporary connections to further parts inside the final product. The antenna is embedded, e.g. it is or may be embedded in the system usually formed by a portable apparatus.

The embedded antenna 30 is suitably assembled at a bottom side of a portable apparatus such as a mobile phone. The bottom side herein referred to as the side which is usually at the bottom when holding the mobile phone near one's ear so as to pursue a telephone conversation. Alternatively, it could be any other side that is available and wherein interference with other antennas is relatively small. One alternative appropriate side appears the top side opposite to the bottom side, in case of a substantially block shaped equipment. This turns out to be an advantageous position to minimize the handeffect of the user.

Preferably, the antenna is capacitive in the FM frequency band. The reactance is heavily dependent on the structure and surroundings. For such small antenna, the radiation resistance and induced voltage are also relative constant over the FM band. The antenna feed can be at the centre of the foil or in the corner. A corner feed increases slightly the induced voltage.

The embedding of the antenna within a portable apparatus turns out suitable for reception and transmission. First, the sensitivity to environmental changes limited in compared to an external antenna. Moreover, the portable apparatus and any body in contact therewith turn out to have a positive effect on the antenna operation: the antenna radiation resistance is increased by those bodies of larger size as the cellular phone itself. While such bodies (including the apparatus) give only a slight increase in the capacitance value of the antenna, the induced voltage of the capacitive, embedded antenna is increased in this way.

Figure 5:
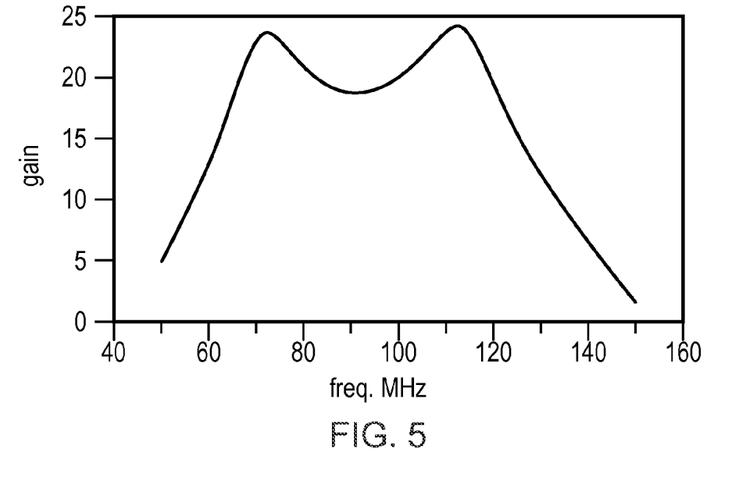
FIG. 5 shows the obtained gain as function of the frequency.

FIG. 5 indicates the gain which is achieved over the frequency band.

The gain is a combination of the antenna filter gain and the gain of the amplifier. The gain shows a first maximum at appr 70 MHz and a second maximum at approximately 110 MHz. A minimum is present at 90 MHz. While the gain at the maxima is close to 25, it is nearly 20 at the mininum. Such variation is gain is understood to be not problematic, as long as the minimum value has a sufficient value, for example 10 db.

Figure 6:
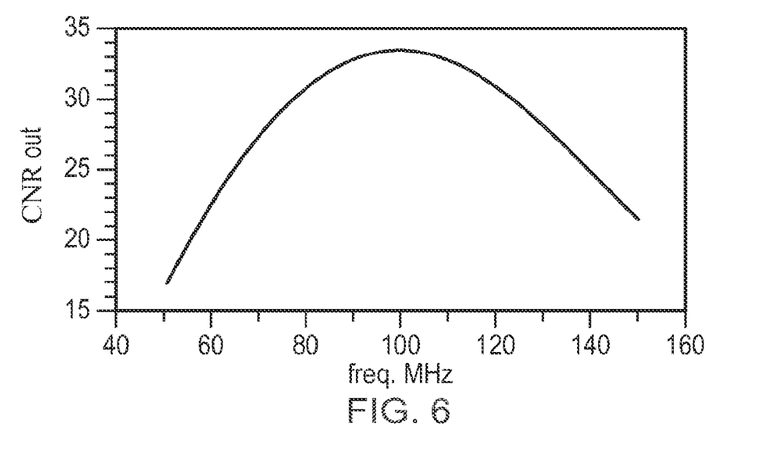
FIG. 6 shows the carrier to noise ratio as a function of the frequency.

The RF carrier to noise ratio over the frequency band turns out more important for the performance of the tuning circuit. FIG. 6 indicates the RF carrier to noise at the output of the tuning circuit for an electric field strength of 1 mV/m. The shown example has been a frequency band in the range from 87.5 MHz to 108 MHz (European broadcast band). For E-field of 1 mV/m, noise=76 nV (at 200 KHz BW) and received signal of 17 uV. As shown in the Figure, the CNR has a value of approximately 32.5 dB at 87 MHz and approximately 33 dB at 110 MHz, while its maximum of 33.5 dB at approximately 97 MHz. That implies that the variation is at most 1.5 dB, and thus substantially flat. The creation of a filter circuit with a substantially flat CNR across a broadcast band of 76 to 108 MHz is also possible.

Figure 7:
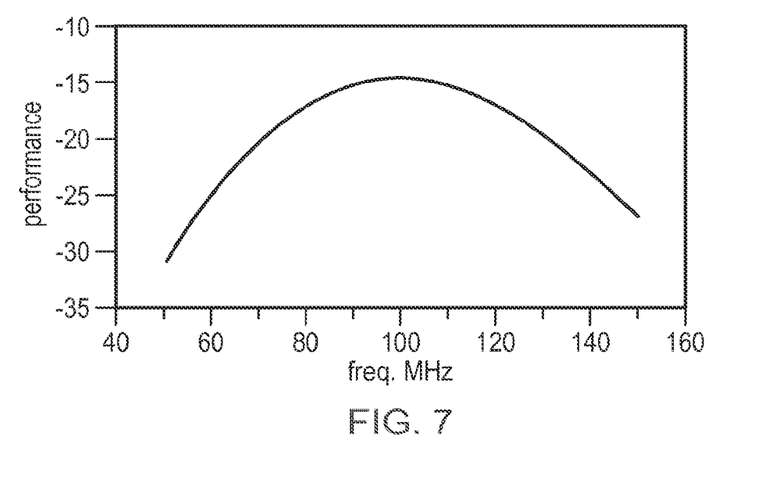
FIG. 7 shows performance difference between a headphone antenna and an embedded antenna as a function of the frequency.

FIG. 7 shows performance difference in db against the frequency, for an embedded antenna referenced to a headphone wire used as antenna. This graph shows that the headphone wire actually performs better, but the difference is maximum 17 dB. This difference turns out acceptable.

Second Embodiment

Figure 8:
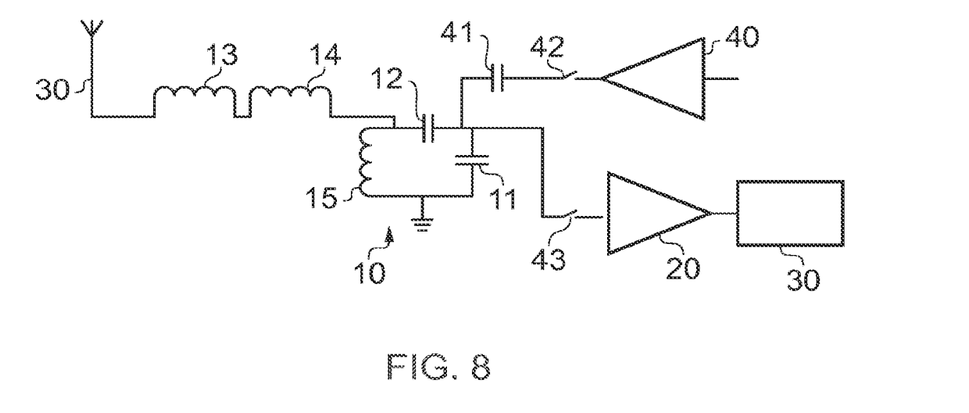
FIG. 8 shows a schematic for circuit including receive and transmit mode.

FIG. 8 shows a schematic of a second embodiment of the system of the invention. This system further comprises a transmit circuit 40. The transmit circuit 40 is coupled the filter circuit 10 over a coupling 41 that is able to reject DC signals, but transmits RF signals. This coupling is for instance achieved with a capacitor 41 of sufficient size, for instance 1 nF or more. In order to combine a transmit circuit 40 and a receiver circuit 50 with a single antenna 30, an receive/transmit switch 42 is needed to prevent that amplified signals from the transmit circuit 40 enter the receiver circuit 50 and particularly the amplifier 20 directly. In a first implementation, a single receive/transmit switch 42 is provided, for instance between the coupling 41 and both of the transmit circuit 40 and the amplifier. In a second implementation, a second receive/transmit switch 43 is present, such that there is one switch 42 between transmit circuit 40 and coupling 41 and one switch between filter circuit 10 and amplifier 20.

It has been found that the filter circuit 10 and embedded antenna 30 of the invention are not merely effective for reception of signals in a broadcast band, but in transmit mode of signals in such broadcast band. Suitably thereto, the output impedance of the transmit circuit is similar to the input impedance of the amplifier. Particularly, values in the order of 20 Ohm to 2 Kohm, preferably in the range of 100-400 Ohm.

It is observed that a capacitive antenna performs herein clearly better than a conventional inductive antenna with a ferrite. Such an inductive antenna provides a very low induced voltage of 1 to 3 uV (for a field strength E of 1 (mV/m) in the receive mode. The current consumption in transmit mode is 20 to 50 mA for 50 nW effective radiated power (ERP). The use of a capacitive antenna results in an induced voltage of 5 to 25 uV (for a field strength E of 1 mV/m, in receive mode). The current requirement in transmit mode for 50 nW ERP is 0.5 to 4 mA. In other words, the induced voltage in the receive mode is 5-8 times as large for an inductive antenna. The current consumption in transmit mode is only 5-10% of that for an inductive antenna. It will be understood that these values have been obtained for optimized antenna designs and optimized antenna location of the capacitive antenna.

It is even possible to drive a constant current through the antenna, which is required to generate an electrical field that is almost the same in the entire frequency band of interest. This is achieved by shaping the voltage across the antenna can be shaped to have a relative constant current through the antenna. One can arrange this with the same filter circuit as used for receiving. An extra coupling capacitor between the source and the circuit can be added.

Figure 9:
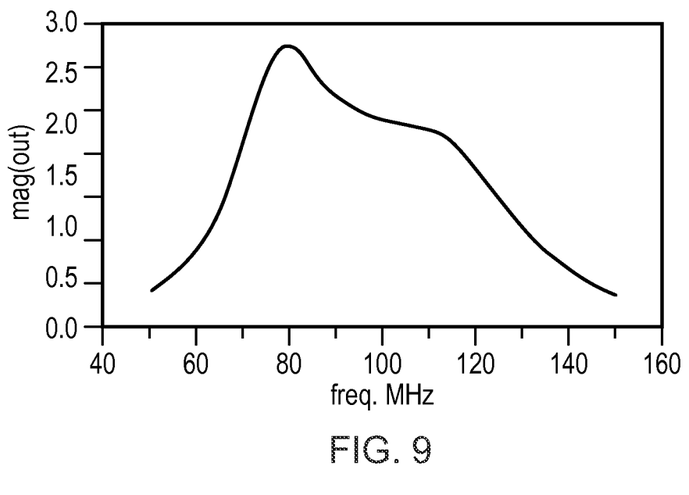
FIG. 9 shows the voltage across the antenna.

FIG. 9 below indicates the voltage in volts, over the antenna across the frequency band. The voltage compensates for the frequency dependence of the reactance of the antenna capacitance. This is for a source voltage of 0.7 volts.

Figure 10:
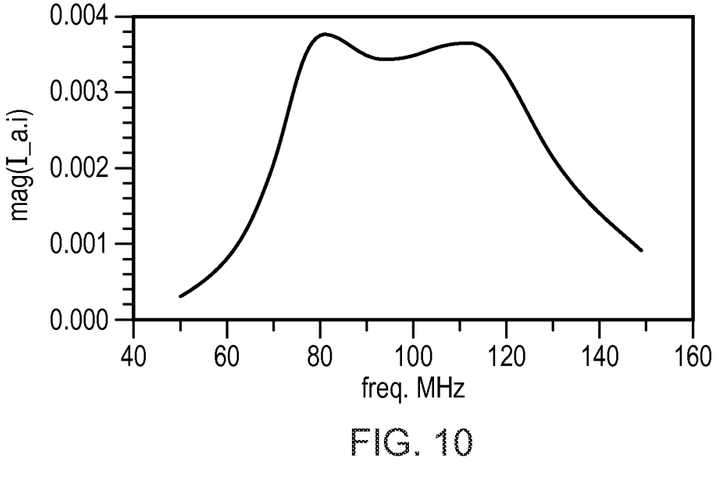
FIG. 10 shows the current transmitted through the antenna as a function of the frequency.

FIG. 10 shows a plot below indicates the current though the antenna in mA, across the frequency band of interest. As can be seen, the current is fairly constant. This is for a source voltage of 0.7 volts.

LIST OF REFERENCE NUMERALS

10 filter circuit
11 first capacitor
12 second capacitor
13 first inductor
14 second inductor
15 third inductor
20 amplifier
21 first transistor
22 second transistor
23 first resistor
24 second resistor
25 third resistor
26 input electrode of first transistor
27 output of the amplifier
30 embedded antenna
40 transmit circuit
41 coupling capacitor
42 receive/transmit switch
43 second receive/transmit switch
50 receiver circuit
60 non-embedded antenna
61 balun

The invention claimed is:

1. An apparatus comprising
a broadcast receiver circuit,
an embedded antenna configured and arranged for receiving broadcast signals in a broadcast band of interest, the embedded antenna being less than one tenth of the wavelength corresponding to a center frequency of the broadcast band of interest and for presenting a primarily reactive impedance, and
a tuning circuit coupled between the antenna and the broadcast receiver circuit, which tuning circuit includes a filter circuit coupled to ground, wherein the filter circuit includes primarily reactive impedance of the embedded antenna and the tuning circuit is configured and arranged to have a first resonance at a first frequency below a lower cutoff frequency for the broadcast band of interest, and a second resonance at a second frequency above an upper cutoff frequency of the broadcast band and wherein the tuning circuit comprises an amplifier with an output to the receiver circuit and with an input to the filter circuit, and wherein the tuning circuit is configured to provide a carrier to noise ratio (CNR) which is substantially flat across the broadcast band.

2. The apparatus as claimed in claim 1, wherein the filter circuit and the amplifier have a comparable noise level.

3. The apparatus as claimed in claim 1, wherein the tuning circuit is configured and arranged to provide a gain with respect to signals passed via the antenna, with the gain having peaks at the respective resonance frequencies above and below the broadcast band of interest, and wherein variations of the CNR across the broadcast band is at most 1.5 dB.

4. The apparatus as claimed in claim 1, wherein the amplifier has an input impedance in the range of 20Ω to 500Ω for an inductive antenna, and 300Ω to 2 kΩ for a capacitive antenna.

5. The apparatus as claimed in claim 4, wherein the amplifier comprises an internal feedback to the input.

6. The apparatus as claimed in claim 4, wherein the noise level of the amplifier is reduced in that the amplifier has an input electrode with a reduced resistance connection.

7. The apparatus as claimed in claim 6, wherein the input electrode is connected to the base of a bipolar transistor with an increased surface area.

8. The apparatus as claimed in claim 1, wherein the filter circuit comprises inductors, which inductors have quality factors in the range of 30 to 100, and wherein the broadcast band of interest in the range between 76 Mhz to 108 Mhz.

9. The apparatus as claimed in claim 1, further comprising a transmit circuit coupled to the filter circuit for wireless transmission of audio signals through the antenna, wherein the filter circuit is designed to operate as a filter for suppressing of harmonics in a transmitted signal.

10. The apparatus as claimed in claim 1, wherein the antenna is a capacitive antenna.

11. The apparatus as claimed in claim 9, wherein the transmit circuit has an output impedance that is substantially equal to an input impedance of the amplifier.

12. The apparatus as claimed in claim 1, further including an integrated circuit, the integrated circuit including the amplifier and the broadcast receiver circuit.

13. The apparatus of claim 1, wherein the filter circuit includes a series circuit that is connected in series between an antenna and an amplifier, and that is inductive for frequencies above a geometric mean of the broadcast band and capacitive for frequencies below the geometric mean of the broadcast band.

14. The apparatus of claim 1, wherein the filter circuit includes
   a series circuit connected in series between an antenna and an amplifier and having a capacitance and an inductance,
   a first circuit in parallel with the series circuit and having a capacitance value that corresponds to the capacitance of the series circuit, and
   a second circuit in parallel with the series circuit and having an inductance value that corresponds to the inductance of the series circuit.

15. The apparatus of claim 1, wherein the CNR is a ratio of a level of a signal in the broadcast band at a certain frequency and the noise at the certain frequency, prior to demodulation, and wherein the tuning circuit is configured and arranged to provide the CNR across the broadcast band via overlap of the first and second resonant frequencies.

16. The apparatus of claim 1, wherein the first resonance and the second resonance are defined by circuitry in the tuning circuit to set the passband according to the desired broadcast band of interest.

17. A method comprising:
   switching an apparatus to a receive mode that filters broadcast signals from being received by a transmit circuit of the apparatus;
   receiving broadcast signals in a broadcast band of interest at an embedded antenna, the embedded antenna being less than one tenth of the wavelength corresponding to a center frequency of the broadcast band of interest and for presenting a primarily reactive impedance;
   filtering, using a filter circuit of a tuning circuit, wherein the filter circuit includes the primarily reactive impedance of the embedded antenna and the filter circuit coupled to ground and to the transmit circuit;
   receiving the broadcast signals from the antenna at the tuning circuit that includes an amplifier and having a first resonance at a first frequency below a lower cutoff frequency for a broadcast band of interest, and a second resonance at a second frequency above an upper cutoff frequency of the broadcast band; and
   providing, to a receiver circuit and from the tuning circuit, the broadcast signals having a carrier to noise ratio (CNR) which is substantially flat across the broadcast band.

18. The method of claim 17, further including the steps of:
   switching the apparatus to a transmit mode such that transmitted signals cannot enter the amplifier and the broadcast receiver circuit; and
   transmitting the signals through the tuning circuit and the antenna to generate an effective radiated power of 1 uW or less, and wherein variations of the CNR across the broadcast band is at most 1.5 dB.

19. The method of claim 17, wherein receiving the broadcast signals from the antenna at the tuning circuit includes using the first and second resonances to provide a gain with respect to signals passed via the antenna, with the gain having peaks at the respective resonant frequencies that are above and below the frequencies within the broadcast band of interest.

* * * * *